(12) United States Patent
Guven et al.

(10) Patent No.: US 8,055,944 B2
(45) Date of Patent: Nov. 8, 2011

(54) CUSTOMIZATION AND REUSE OF LOGGED AGENT ACTIVITY DURING REMOTE TAKE OVER HELP SESSION

(75) Inventors: Sinem Guven, New York, NY (US); Gopal Pingali, Mohegan Lake, NY (US); Claudio S. Pinhanez, Sao Paulo (BR); Mark E. Podlaseck, Kent, CT (US)

(73) Assignee: International Business Machines Corporation, Armonk, NY (US)

( * ) Notice: Subject to any disclaimer, the term of this patent is extended or adjusted under 35 U.S.C. 154(b) by 294 days.

(21) Appl. No.: 12/190,257

(22) Filed: Aug. 12, 2008

(65) Prior Publication Data

US 2010/0042867 A1 Feb. 18, 2010

(51) Int. Cl.
*G06F 11/00* (2006.01)
(52) U.S. Cl. .................. 714/26; 714/25; 714/48
(58) Field of Classification Search .......... 714/25, 714/26, 45, 46, 48, 57
See application file for complete search history.

(56) References Cited

U.S. PATENT DOCUMENTS

| 6,742,141 | B1 * | 5/2004 | Miller ............... 714/26 |
| 7,293,201 | B2 * | 11/2007 | Ansari .............. 714/48 |
| 2005/0223285 | A1 * | 10/2005 | Faihe et al. ........ 714/25 |
| 2006/0140031 | A1 * | 6/2006 | Kijima et al. ...... 365/202 |
| 2008/0104447 | A1 * | 5/2008 | Abali et al. ........ 714/25 |
| 2008/0282104 | A1 * | 11/2008 | Khan ............... 714/48 |

* cited by examiner

*Primary Examiner* — Robert Beausoliel, Jr.
*Assistant Examiner* — Joseph D Manoskey
(74) *Attorney, Agent, or Firm* — Connolly Bove Lodge & Hutz LLP; Daniel P. Morris, Esq.

(57) ABSTRACT

An apparatus and a method is provided for verifying the setup of a current computer in need of repair, parsing and updating a previously created activity log file to provide usable steps that refer to the appropriate configuration settings for the computer being repaired. The method includes obtaining an indication of a problem on a remote computer, reviewing stored log files to determine if an old log file associated with the problem exists and if the old log file does not exist, creating a new log file to store steps associated with repair operations. The method also includes if the old log file exists, retrieving the old log file and obtaining the remote computer configurations, parsing the old log file to identify references to configuration settings and comparing the configuration settings in the old log file with the remote computer configuration. The method further includes updating at least one configuration setting of the old log file to reflect the remote computer configuration, if the at least one configuration setting in the old log file is different from the remote computer configuration and executing steps in the old log file to solve the problem on the remote computer.

18 Claims, 5 Drawing Sheets

CUSTOMIZATION AND REUSE OF LOGGED AGENT ACTIVITY DURING REMOTE TAKE OVER HELP SESSION

BACKGROUND OF THE INVENTION

1. Field of the Invention

The present invention is directed to an apparatus and method for verifying the configuration of a computer and for customizing a previously created log activity file, including steps implemented during repair of another computer, to reflect usable steps with appropriate references to correct locations and/or components on the computer.

2. Description of the Related Art

In order to repair a computer located at a remote site, help desk support agents usually log into the computer remotely and take over operations of the computer. When help desk support agents remotely take over operations of the computer, various steps may be implemented. These steps may be monitored and logged into an activity file by an underlying event detector. Such logged activities are associated with the configuration of the computer being repaired. For example, the logged activities may reference an application in a specific location, as determined based on the current configuration of the computer. The logged activity file may be used as a later time by other help desk support agents trying to resolve similar problems. The logged activity file may also be used by customers, as a self-help tool, to resolve computer problems without support from help desk support agents.

One problem agents and customers encounter when reusing associated logged activity file is that the logged activities may not be compatible with the configuration settings on the computer being repaired by the agents or customers. It is well known to those skilled in the art that computer configurations across different computers, or even on the same computer at different points, may vary significantly. For example, various references in the logged activity file to specific computer applications, icons and/or shortcuts may not be available on the computer being repaired. In another example, various references in the logged activity file to computer applications, icons and/or shortcuts may not match the current configuration on the computer being repaired. Thus, such activity logs cannot be readily re-used by agents and/or customers unless a match is made between the current configuration on the computer being repaired and those listed in the logged activity file.

Requiring agents and/or customers to match the current configuration on the computer being repaired with those listed in the logged activity file not only takes time, it may also result in a fruitless effort. For example, an icon referred to in the logged activity file may not exist on the computer being repaired. In another example, although the icon may be available on the computer being repaired, the icon may be stored under a different name.

BRIEF SUMMARY OF THE INVENTION

The present invention is directed to an apparatus and a method for verifying the setup of a current computer in need of repair, parsing and updating a previously created activity log file to provide usable steps that refer to the appropriate configuration settings for the computer being repaired.

An embodiment of the invention is directed to a method including obtaining an indication of a problem on a remote computer, reviewing stored log files to determine if an old log file associated with the problem exists and if the old log file does not exist, creating a new log file to store steps associated with repair operations. The method also includes if the old log file exists, retrieving the old log file and obtaining the remote computer configurations, parsing the old log file to identify references to configuration settings and comparing the configuration settings in the old log file with the remote computer configuration. The method further includes updating at least one configuration setting of the old log file to reflect the remote computer configuration, if the at least one configuration setting in the old log file is different from the remote computer configuration and executing steps in the old log file to solve the problem on the remote computer.

Another embodiment of the invention is directed to an apparatus including an obtaining unit configured to obtain an indication of a problem on a remote computer, a reviewing unit configured to review stored log files to determine if an old log file associated with the problem exists and a creating unit configured to create, if the old log file does not exist, a new log file to store steps associated with repair operations. The apparatus also includes a retrieving unit configured to retrieve, if the old log file exists, the old log file and obtaining the remote computer configurations and a processing unit configured to parse the old log file to identify references to configuration settings and compare the configuration settings in the old log file with the remote computer configuration. The apparatus further includes an updating unit configured to update at least one configuration setting of the old log file to reflect the remote computer configuration, if the at least one configuration setting in the old log file is different from the remote computer configuration and an executing unit configured to execute steps in the old log file to solve the problem on the remote computer.

Another embodiment of the invention is directed to a method including obtaining an indication of a problem on a computer, reviewing stored log files to determine if an old log file associated with the problem exists and retrieving the old log file and obtaining the computer configurations. The method also includes parsing the old log file to identify references to configuration settings and comparing the configuration settings in the old log file with the computer configuration. The method further includes updating at least one configuration setting of the old log file to reflect the computer configuration, if the at least one configuration setting in the old log file is different from the computer configuration and executing steps in the old log file to solve the problem on the computer.

Another embodiment of the invention is directed to a computer program embodied on a computer readable medium, the computer program comprises program code for controlling a processor to execute a method including obtaining an indication of a problem on a computer, reviewing stored log files to determine if an old log file associated with the problem exists and retrieving the old log file and obtaining the computer configurations. The method also includes parsing the old log file to identify references to configuration settings and comparing the configuration settings in the old log file with the computer configuration. The method further includes updating at least one configuration setting of the old log file to reflect the computer configuration, if the at least one configuration setting in the old log file is different from the computer configuration; and executing steps in the old log file to solve the problem on the computer.

DETAILED DESCRIPTION OF EMBODIMENTS

Embodiments in which the present invention is applied to verifying the setup of a current computer in need of repair, parsing and updating a previously created activity log file to provide usable steps that refer to the appropriate configuration settings for the computer being repaired is described in detail below with reference to the accompanying drawings.

An embodiment of the present invention is directed to automatically customizing a log activity file created by a help desk support agent during a remote repair of a computer. During the remote repair, actions taken by the help desk support agent are recorded and stored in a log activity file. In an embodiment of the invention, an event detector constantly monitors the activities of the help desk support agent and stores the agent's activities in a log file. The monitoring may be at a high level and/or at lower levels. For example, the event detector may monitor files modified, URLs browsed, e-mail sent, chat activity and other actions which occur at a high level. The event detector may also monitor and detect icons clicked, text fields edited, file content modified and/or other actions which occur at lower levels.

Having monitored and logged the agent's activities, an embodiment of the present invention enables parsing of the log file to identify references. For example, the log file may be parsed to identify references to file locations, icons and/or software. When the logged file is being reused to repair another computer, the present invention enables review of the current computer configuration of the computer being repaired to create the correct settings for references stored in the logged file. If the settings for references stored in the log file are different from the configuration associated with the computer being repaired, an embodiment of the present invention updates the original references in the log file with the correct settings from the computer being repaired.

Figure 1:
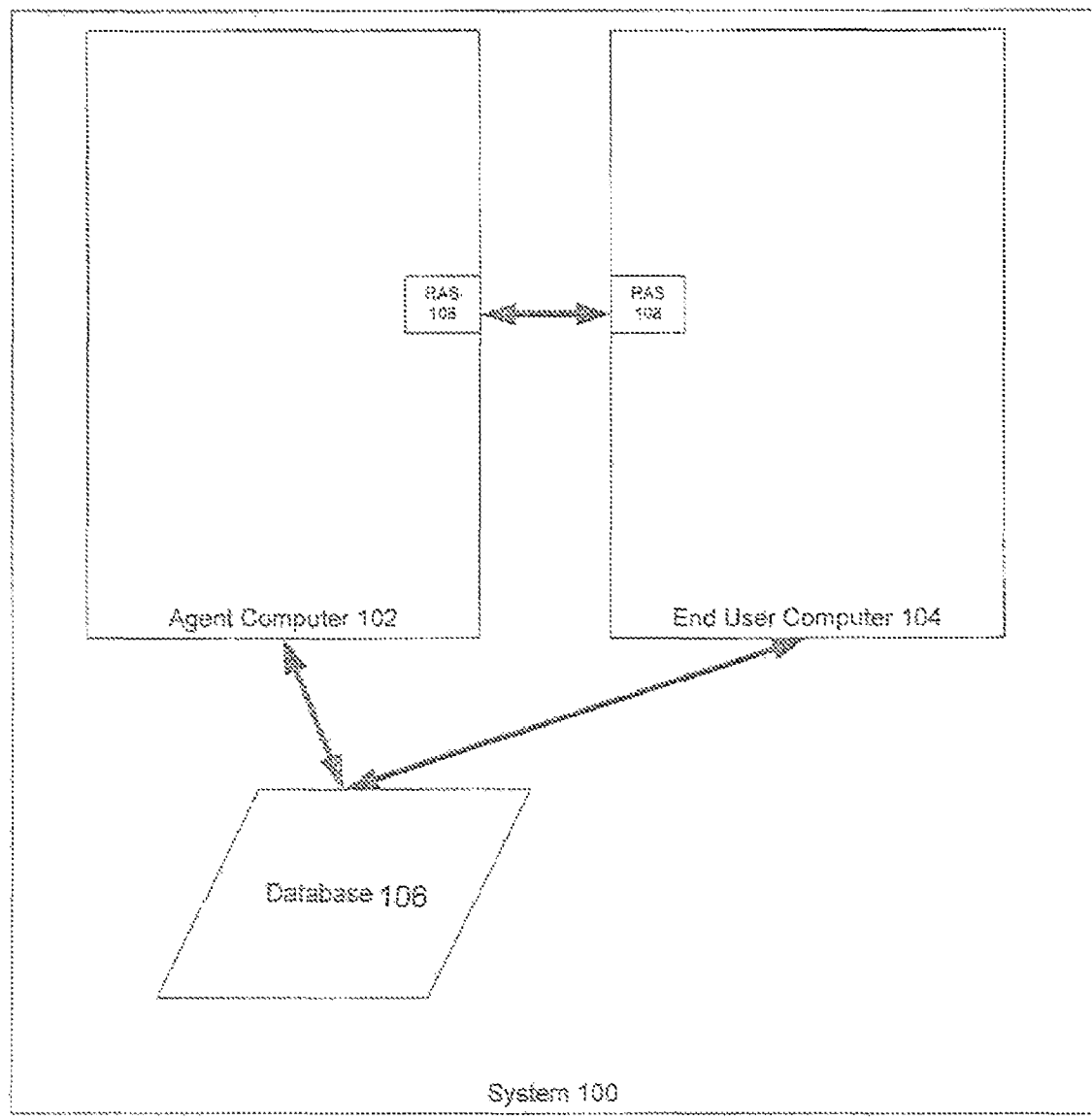
FIG. 1 illustrates an example of the hardware architecture in which an embodiment of the present invention may be implemented.

FIG. 1 illustrates an example of the hardware architecture/system 100 in which an embodiment of the present invention may be implemented. The system includes at least one agent computer 102 and at least one end user computer 104. The system may also include a database 104 which includes log files created by help desk support agents operating on agent computer 102. As is known to one skilled in the art, agent computer 102 and database 104 may be remotely or locally associated. Agent computer 102 and database 104 also may be part of the same network. A help desk support agent operating on agent computer 102 may log into end user computer 104 via a remote access apparatus 108. As is also known to those skilled in the art, each of computers 102 and 104 includes at least one processor for implementing operations executed on the computer, memory sections for storing data and software application and peripheral devices for interfacing with the users. Each of computers 102 and 104 may also include network devices and interfaces for enabling communications between computers 102 and 104 and other network devices.

Upon determination that an end user computer needs to be repair, for example through a remote request from the end user computer 104 or through a phone call to a help desk, agent computer 102 logs into end user computer 104 through a remote access apparatus (RAS) 108, components of which may be resident on both computer 102 and 104. Agent computer 102 typically takes over all operations of the end user computer through RAS.

Agent computer 102 also reviews the log files stored in database 106 to determine if a log file associated with a similar problem to be repaired exists in database 106. If a log file associated with a similar problem to be repaired does not exist in database 106, agent computer 102 creates a new log file to store activities associated with repair operations. Event detector (not shown) monitors remote steps executed on the end user computer 104 based on instructions provided by agent computer 102. In an embodiment of the invention, event detector may be located in agent computer 102. In another embodiment of the invention, event detector may be externally located but in communications with agent computer 102. All remote steps implemented by agent computer 102 may be logged into a log file which may be stored in a local memory and/or in database 106.

If a log file associated with a similar problem to be repaired does exist in database 106, agent computer 102 retrieves the log file and checks the computer configuration of end user computer 104. Based on the current configuration of end user computer 104, agent computer parses the log file to identify references to configurations settings. For example, the log file may be parsed to .identify references to file locations, icons and/or software. If the configuration settings for references stored in the log file are different from the configuration settings associated with end user computer 104 being repaired, agent computer 102 creates a new log file which is customized to reflect the configuration settings for end user computer 104. In an alternate embodiment, agent computer 102 may update the log file to reflect the configuration settings associated with end user computer 104 being repaired. Agent computer 102 then executes the steps implemented in the new log file in order to repair end user computer.

If a problem is to be resolved by an end user without agent computer 102 remotely dialing in, upon determination that a repair is needed, end user computer 104 searches the log files stored in database 106 to determine if a log file associated with a similar problem to be repaired exists in database 106. If a log file associated with a similar problem to be repaired exists in database 106, end user computer 104 retrieves the log file. End user computer also retrieves its current configuration. End user computer 104 parses the log file to identify references to configurations settings in the log file. If the configuration settings for references stored in the log file are different from the configuration settings associated with end user computer 104, end user computer 104 creates a new log file which is customized to reflect its configuration settings. Alternatively, end user computer may update the log file to reflect its configuration settings. End user computer 104 then executes the steps implemented in the new log file in order to resolve an existing problem.

Figure 2:
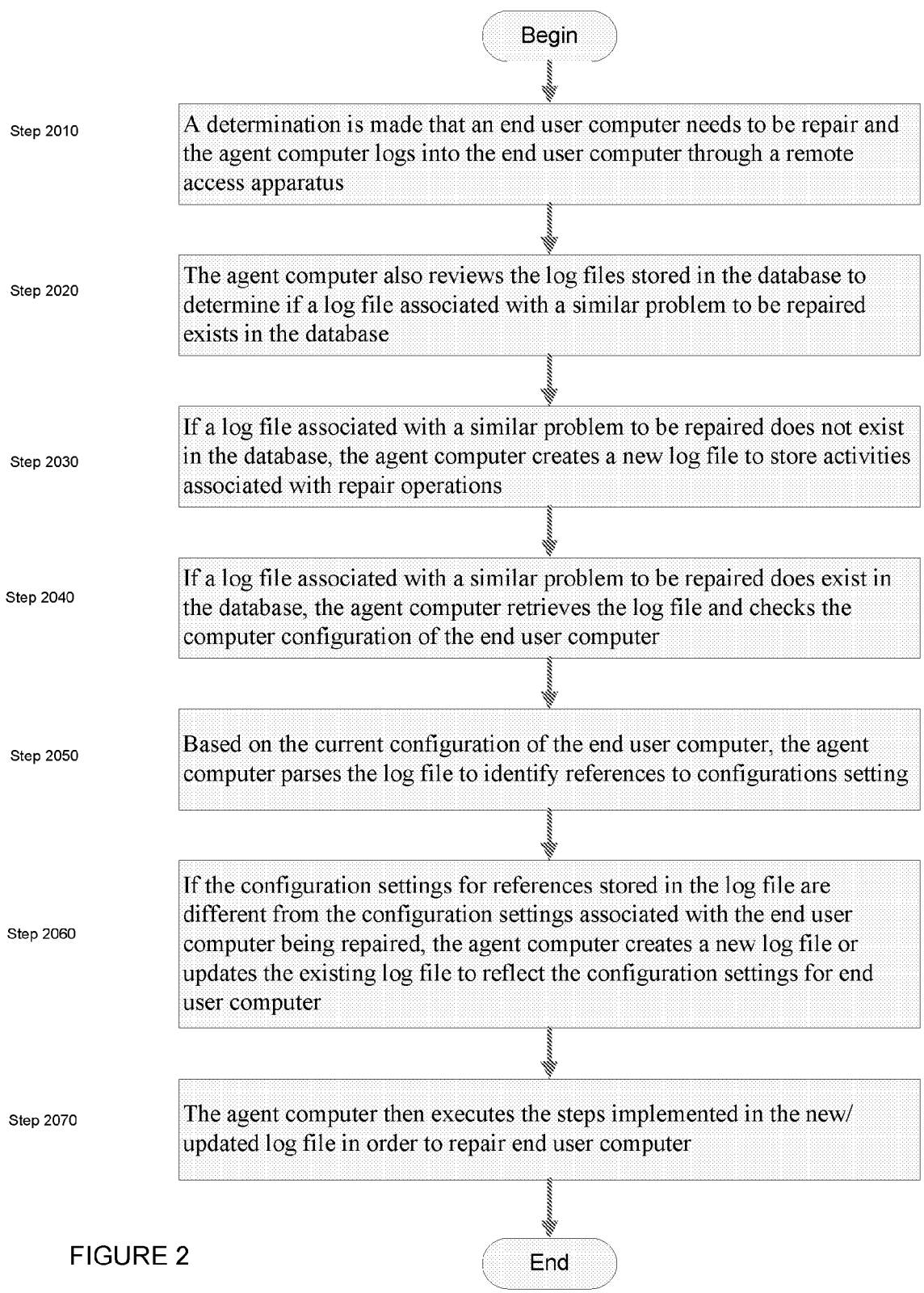
FIG. 2 illustrates the steps implemented on the agent computer.

FIG. 2 illustrates the steps implemented in the agent computer. In Step 2010, a determination is made that an end user computer needs to be repair and agent computer 102 logs into end user computer 104 through a remote access apparatus. In Step 2020, agent computer 102 also reviews the log files stored in database 106 to determine if a log file associated with a similar problem to be repaired exists in database 106. In Step 2030, if a log file associated with a similar problem to he repaired does not exist in database 106, agent computer 102 creates a new log file to store activities associated with repair operations. All remote steps implemented by agent computer 102 may be logged into a log file which may be stored in a local memory and/or in database 106.

In Step 2040, if a log file associated with a similar problem to be repaired does exist in database 106, agent computer 102 retrieves the log file and checks the computer configuration of end user computer 104. In Step 2050, based on the current configuration of end user computer 104, agent computer parses the log file to identify references to configurations setting. In Step 2060, if the configuration settings for references stored in the log file are different from the configuration settings associated with end user computer 104 being repaired, agent computer 102 creates a new log file or updates the existing log file to reflect the configuration settings for end user computer 104. In Step 2070, agent computer 102 then executes the steps implemented in the new/updated log file in order to repair end user computer.

Figure 3:
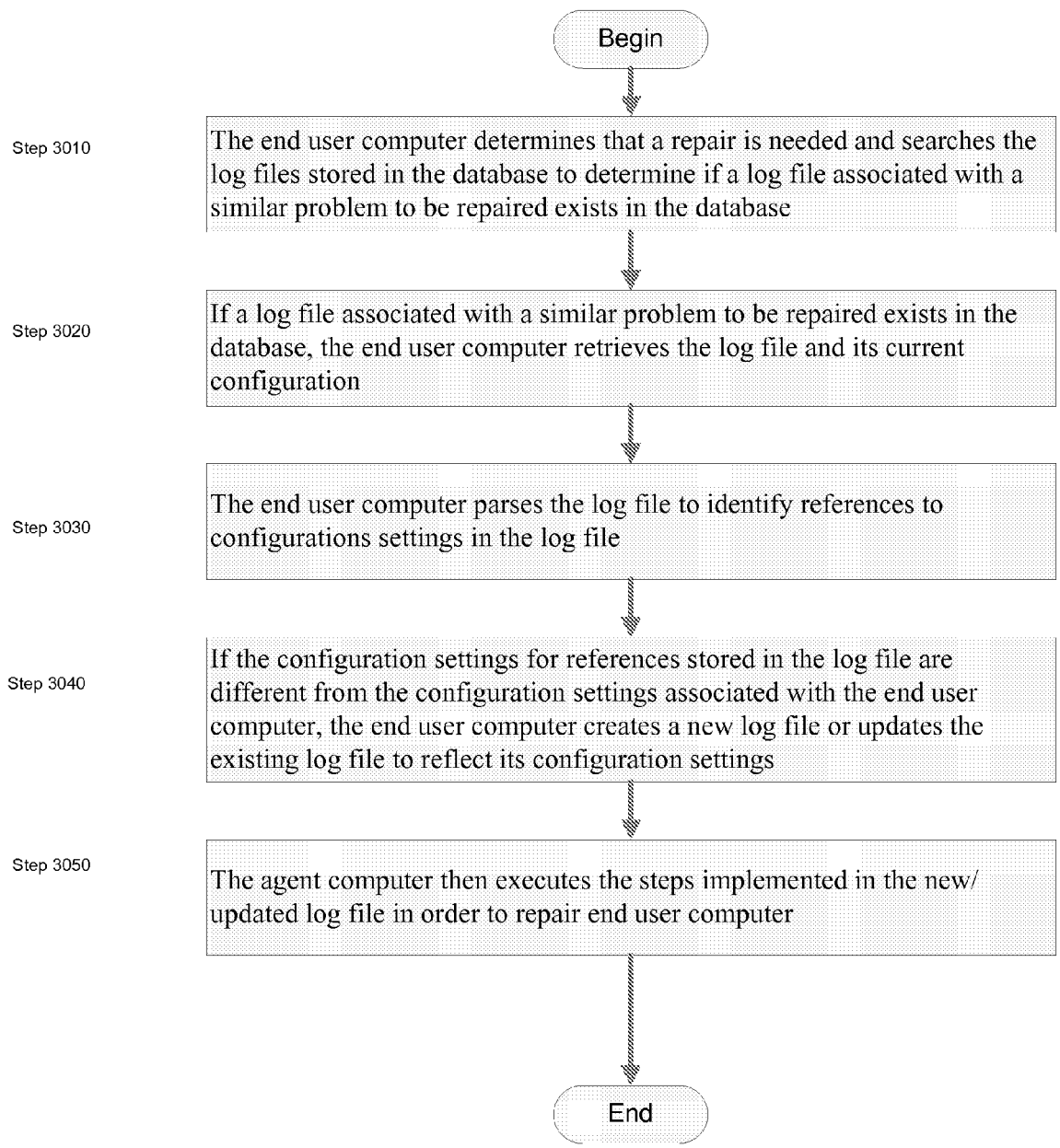
FIG. 3 illustrates the steps implemented on the end user computer.

FIG. 3 illustrates the steps implemented in the end user computer. In Step 3010, end user computer 104 determines that a repair is needed and searches the log files stored in database 106 to determine if a log file associated with a similar problem to be repaired exists in database 106. In Step 3020, if a log file associated with a similar problem to be repaired exists in database 106, end user computer 104 retrieves the log file and its current configuration. In Step 3030, end user computer 104 parses the log file to identify references to configurations settings in the log file. In Step 3040, if the configuration settings for references stored in the log file are different from the configuration settings associated with end user computer 104, end user computer 104 creates a new log file or updates the existing log file to reflect its configuration settings. In Step 3050, end user computer 104 then executes the steps implemented in the new log file in order to resolve an existing problem.

Figure 4:
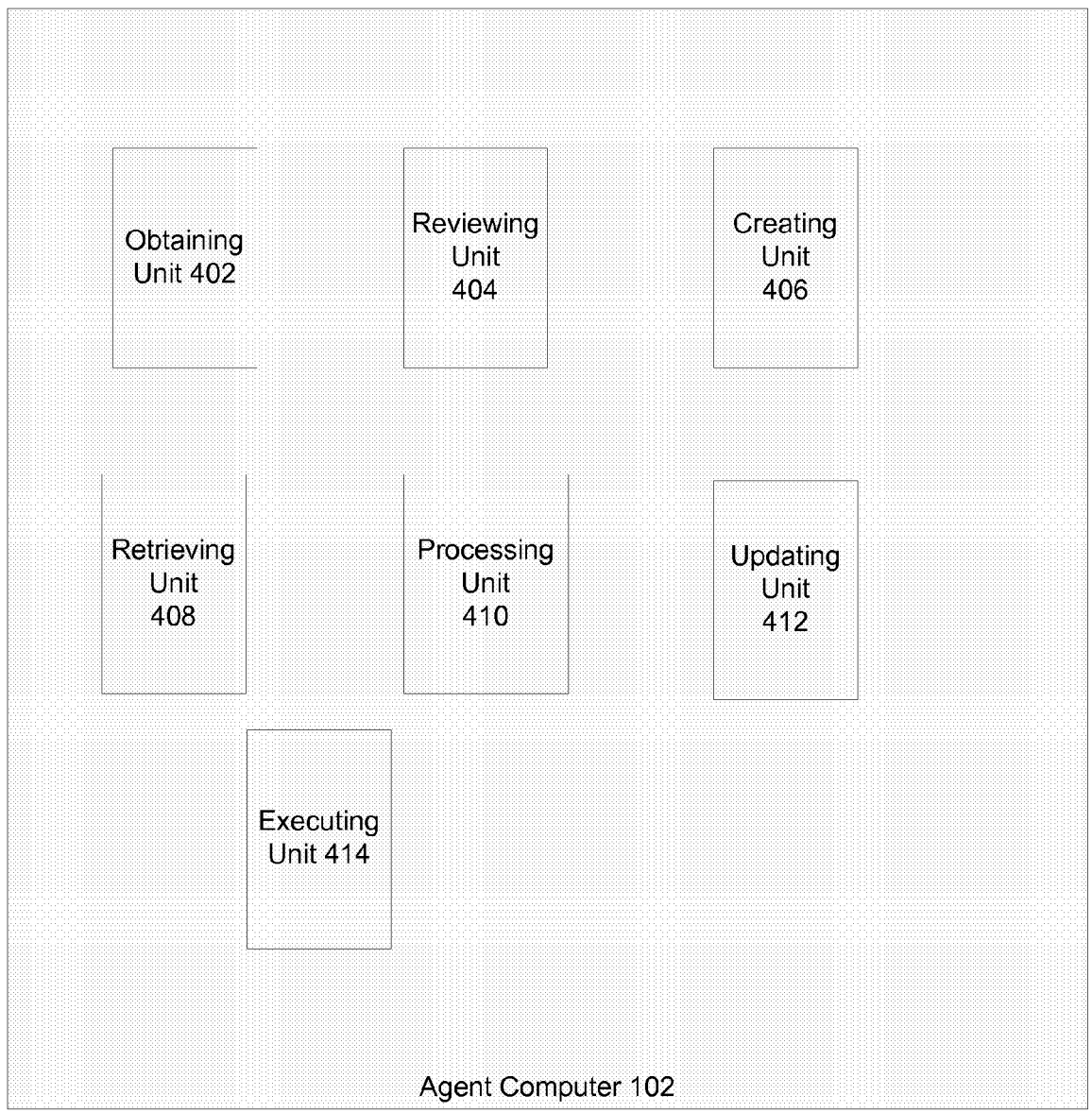
FIG. 4 illustrates an embodiment of the agent computer.

FIG. 4 illustrates an embodiment of the agent computer 102. Agent computer 102 includes an obtaining unit 402 configured to obtain an indication of a problem on a remote computer and a reviewing unit 404 configured to review stored log files to determine if an old log file associated with the problem exists. Agent computer also includes a creating unit 406 configured to create, if the old log file does not exist, a new log file to store steps associated with repair operations, a retrieving unit 408 configured to retrieve, if the old log file exists, the old log file and obtaining the remote computer configurations and a processing unit 410 configured to parse the old log file to identify references to configuration settings and compare the configuration settings in the old log file with the remote computer configuration. The agent computer further includes an updating unit 412 configured to update at least one configuration setting of the old log file to reflect the remote computer configuration, if the at least one configuration setting in the old log file is different from the remote computer configuration and an executing unit 414 configured to execute steps in the old log file to solve the problem on the remote computer.

Figure 5:
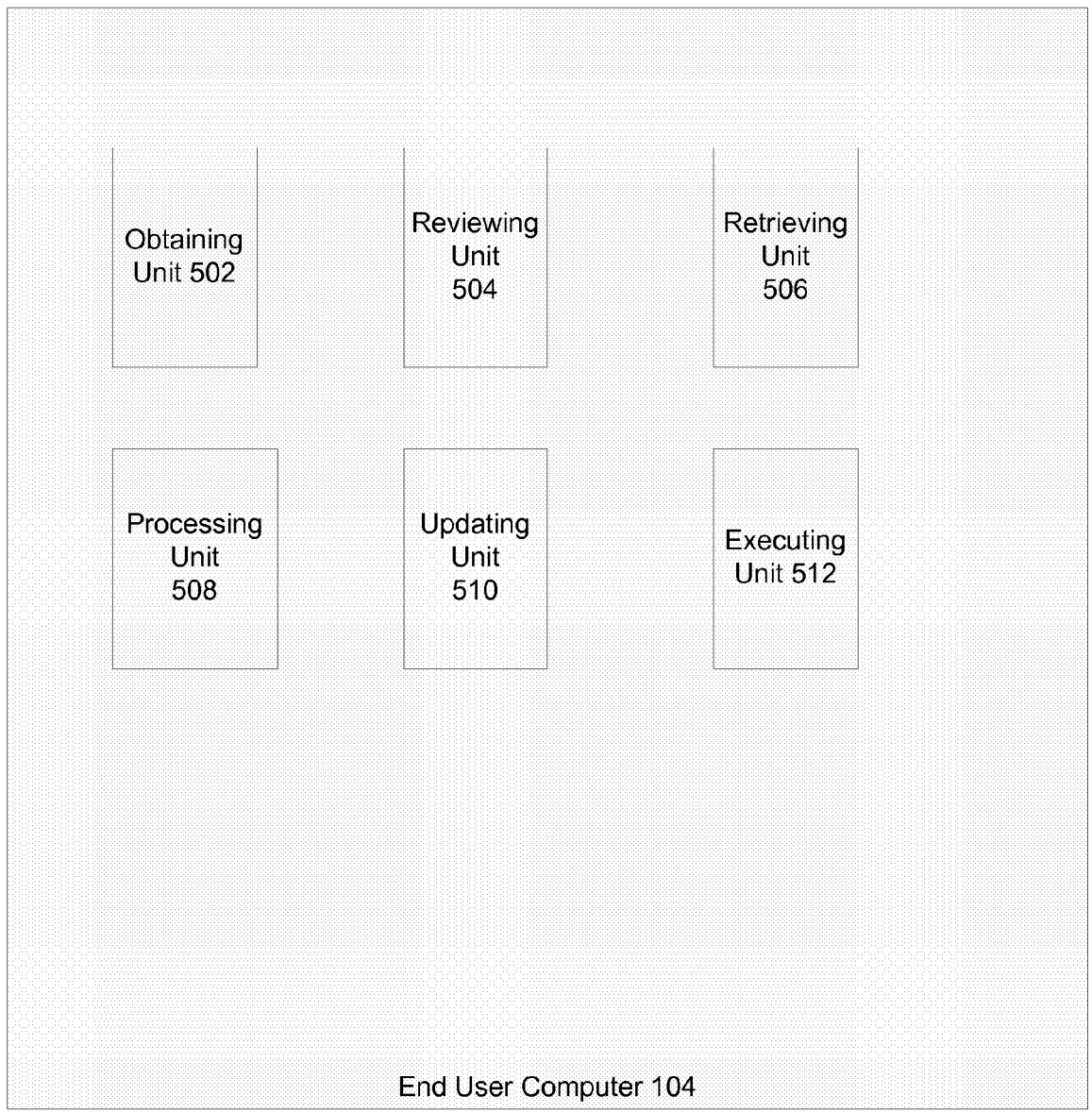
FIG. 5 illustrates an embodiment of the end user computer.

FIG. 5 illustrates an embodiment of the end user computer 104. The end user computer includes an obtaining unit 502 configured to obtain an indication of a problem on a computer, a reviewing unit 504 configured to review stored log files to determine if an old log file associated with the problem exists and a retrieving unit 506 configured to retrieve the old log file and obtaining the computer configurations. The end user computer also includes a processing unit 508 configured to parse the old log file to identify references to configuration settings and compare the configuration settings in the old log file with the computer configuration. The end user computer further includes an updating unit 510 configured to update at least one configuration setting of the old log file to reflect the computer configuration, if the at least one configuration setting in the old log file is different from the computer configuration and an executing unit 512 configured to execute steps in the old log file to solve the problem on the computer. The reviewing unit 504 is configured to review a plurality of log files stored in a database. The processing unit 508 is configured to identify references to at least one of file locations, icons or software applications.

As should be apparent to one of ordinary skill in the art, the components illustrated in FIGS. 4 and 5 may be implemented by one or more processing units. The components illustrated in FIGS. 4 and 5 may also be combined into one or more components which implement the associated functions described above. Similarly, the components illustrated in FIGS. 4 and 5 may also be separated into one or more components which implement the associated functions described above.

Although the present invention has been shown and described with respect to certain embodiments, it should be understood by those skilled in the art that various modifications can be made to the inventive testing device and the method of the instant invention without departing from the scope and spirit of the invention. It is intended that the present invention cover modifications and variations of the inventive testing device and method provided they come within the scope of the appended claims and their equivalents.

What is claimed:

1. A method, comprising:
obtaining an indication of a current problem on a remote computer;
reviewing stored log files, wherein respective ones of the stored log files have stored therein actions previously taken in addressing particular respective problems, to determine if an old log file, having stored therein actions taken relating to addressing the current problem, exists;
if the old log file does not exist, creating a new log file to store steps associated with repair operations;
if the old log file exists, retrieving the old log file and obtaining the remote computer configurations;
parsing the old log file to identify references to configuration settings and comparing the configuration settings in the old log file with the remote computer configuration;
updating at least one configuration setting of the old log file to reflect the remote computer configuration, if the at least one configuration setting in the old log file is different from the remote computer configuration; and
executing steps in the old log file to solve the current problem on the remote computer.

2. The method of claim 1, wherein the reviewing stored log files comprises reviewing a plurality of log files stored in a database.

3. The method of claim 1, wherein the obtaining an indication of a current problem on a remote computer comprises logging in to the remote computer through a remote access apparatus.

4. The method of claim 1, wherein the creating a new log file comprises monitoring remote steps executed on the remote computer and storing the remote steps in the new log file.

5. The method of claim 1, wherein the parsing the old log file comprises identifying references to at least one of file locations, icons or software applications.

6. The method of claim 1, wherein the parsing the old log file comprises identifying references to at least one of file locations, icons or software applications.

7. The method of claim 1, wherein at least said obtaining an indication of a current problem, said reviewing, said creating, said retrieving the old log file and obtaining the remote computer configurations, said parsing and comparing, and said updating are performed at a computer different from said remote computer.

8. An apparatus, comprising:
an obtaining unit configured to obtain an indication of a current problem on a remote computer;
a reviewing unit configured to review stored log files, wherein respective ones of the stored log files have stored therein actions previously taken in addressing particular respective problems, to determine if an old log file, having stored therein actions taken relating to addressing the current problem exists;
a creating unit configured to create, if the old log file does not exist, a new log file to store steps associated with repair operations;
a retrieving unit configured to retrieve, if the old log file exists, the old log file and to obtain the remote computer configurations;
a processing unit configured to parse the old log file to identify references to configuration settings and compare the configuration settings in the old log file with the remote computer configuration;
an updating unit configured to update at least one configuration setting of the old log file to reflect the remote computer configuration, if the at least one configuration setting in the old log file is different from the remote computer configuration; and
an executing unit configured to execute steps in the old log file to solve the current problem on the remote computer.

9. The apparatus of claim 8, wherein the reviewing unit is configured to review a plurality of log files stored in a database.

10. The apparatus of claim 8, comprising a log-in unit configured to log in to the remote computer through a remote access apparatus.

11. The apparatus of claim 8, wherein the creating unit is configured to monitor remote steps executed on the remote computer and store the remote steps in the new log file.

12. The apparatus of claim 8, wherein the processing unit is configured to identify references to at least one of file locations, icons or software applications.

13. The apparatus of claim 8, wherein at least said obtaining unit, said reviewing unit, said creating unit, said retrieving unit, said processing unit, and said updating unit are located remotely from said remote computer.

14. A method, comprising:
obtaining an indication of a current problem on a computer;
reviewing stored log files, wherein respective ones of the stored log files have stored therein actions previously taken in addressing particular respective problems, to determine if an old log file, having stored therein actions taken relating to addressing the current problem, exists;
retrieving the old log file and obtaining the computer configurations;
parsing the old log file to identify references to configuration settings and comparing the configuration settings in the old log file with the computer configuration;
updating at least one configuration setting of the old log file to reflect the computer configuration, if the at least one configuration setting in the old log file is different from the computer configuration; and
executing steps in the old log file to solve the current problem on the computer.

15. The method of claim 14, wherein the reviewing stored log files comprises reviewing a plurality of log files stored in a database.

16. The method of claim 14, wherein at least said obtaining an indication of a current problem, said reviewing, said retrieving the old log file and obtaining the remote computer configurations, said parsing and comparing, and said updating are performed at a computer different from said remote computer.

17. A computer program embodied on a non-transitory computer readable medium, wherein the computer program comprises program code for controlling a processor to execute a method comprising:
obtaining an indication of a current problem on a computer;
reviewing stored log files, wherein respective ones of the stored log files have stored therein actions previously taken in addressing particular respective problems, to determine if an old log file, having stored therein actions taken relating to addressing the current problem, exists;
retrieving the old log file and obtaining the computer configurations;
parsing the old log file to identify references to configuration settings and comparing the configuration settings in the old log file with the computer configuration;
updating at least one configuration setting of the old log file to reflect the computer configuration, if the at least one configuration setting in the old log file is different from the computer configuration; and
executing steps in the old log file to solve the current problem on the computer.

18. The computer program of claim 17, wherein said processor is located remotely from said remote computer.

* * * * *